(12) United States Patent
Takeshita (10) Patent No.: US 11,783,683 B2
(45) Date of Patent: Oct. 10, 2023

(54) MANAGEMENT DEVICE, MANAGEMENT SYSTEM, MANAGEMENT METHOD, AND NON-TRANSITORY COMPUTER READABLE MEDIUM

(71) Applicant: JVCKENWOOD Corporation, Yokohama (JP)

(72) Inventor: Hiroshi Takeshita, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 339 days.

(21) Appl. No.: 17/356,260

(22) Filed: Jun. 23, 2021

(65) Prior Publication Data

US 2021/0319676 A1 Oct. 14, 2021

Related U.S. Application Data

(63) Continuation of application No. PCT/JP2019/042939, filed on Oct. 31, 2019.

(30) Foreign Application Priority Data

Jan. 25, 2019 (JP) .................................. 2019-010994

(51) Int. Cl.
*G08B 5/38* (2006.01)
*G06F 3/14* (2006.01)

(52) U.S. Cl.
CPC ............. *G08B 5/38* (2013.01); *G06F 3/1423* (2013.01); *G06F 3/1454* (2013.01)

(58) Field of Classification Search
CPC ................................ G06F 3/1423; G08B 5/38
See application file for complete search history.

(56) References Cited

U.S. PATENT DOCUMENTS

2017/0245309 A1    8/2017    Park et al.

FOREIGN PATENT DOCUMENTS

| JP | 2011-114808 A | 6/2011 |
| JP | 2014-106457 A | 6/2014 |
| JP | 2016066013 A | * 4/2016 |

* cited by examiner

*Primary Examiner* — Kevin Kim
(74) *Attorney, Agent, or Firm* — Procopio, Cory, Hargreaves & Savitch LLP (57) ABSTRACT

A management device is a management device to which a plurality of monitors are connected and which manages information regarding the plurality of monitors, the management device transmitting a signal for causing a screen of a first monitor to blink with a predetermined blinking pattern and setting the first monitor and a second monitor in the same group in a case where a signal indicating that an illuminance sensor corresponding to the second monitor detects the blinking pattern emitted from the screen of the first monitor is received, and the management device transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

7 Claims, 7 Drawing Sheets

MANAGEMENT DEVICE, MANAGEMENT SYSTEM, MANAGEMENT METHOD, AND NON-TRANSITORY COMPUTER READABLE MEDIUM

CROSS REFERENCE TO RELATED APPLICATION

The present application is a Bypass Continuation of PCT/JP2019/042939 filed on Oct. 31, 2019, which is based upon and claims the benefit of priority from Japanese Patent Application No. 2019-010994 filed Jan. 25, 2019, the disclosure of which is incorporated herein by reference.

BACKGROUND

The present invention relates to a management device, a management system, a management method, and a non-transitory computer readable medium.

When a plurality of pieces of information equipment are managed by being connected via wired and wireless networks, there is a case where locations of the information equipment, for example, whether the information equipment is located in the same room or located in different rooms, is managed.

For example, in a case where accuracy of medical monitors for reading medical images is managed at a server, or the like, in an integrated manner, the monitors are often grouped and managed for each location (room, installation site). Further, most medical monitors are often provided with ambient light sensors for detecting ambient luminance to manage illuminance of an environment where reading is performed or to perform calibration in accordance with illuminance.

In this event, medical monitors provided at the same location are not always connected to the same personal computer (PC), and there is a case where medical monitors connected to different PCs are independently provided at the same location. In a case where individual medical monitors are electrically connected via a PC and a network, the medical monitors can perform communication with each other if settings are appropriately made. However, it is difficult to accurately identify that the medical monitors are provided at the same location.

For example, medical monitors connected to networks belonging to the same segment are highly likely to be provided within the same organization. However, whether the medical monitors are provided at locations which are physically close to each other cannot be accurately identified from the above-described information because there is a case where a plurality of locations share the same network segment.

Thus, for example, Patent Literature 1 (Japanese Unexamined Patent Application Publication No. 2011-114808) discloses an equipment management system in which in a case where two monitors respectively detect light whose illuminance changes for equal to or longer than a predetermined time period at a higher frequency than a frequency of an AC power supply which supplies power to the two monitors, it is determined that the two monitors belong to the same group.

However, in the invention disclosed in Patent Literature 1, two monitors are grouped using change in illuminance of illumination light, and even if the two monitors are located in different rooms, there is a case where it is determined that the two monitors belong to the same group depending on change in illuminance of the rooms.

SUMMARY

The present embodiment has been made to solve such a problem and is directed to providing a management device, a management system, a management method, and a non-transitory computer readable medium capable of grouping a plurality of monitors located at the same location with high accuracy.

According to an embodiment, a management device to which a plurality of monitors are connected and which manages information regarding the plurality of monitors, the management device transmitting a signal for causing a screen of a first monitor to blink with a predetermined blinking pattern and setting the first monitor and a second monitor in the same group in a case where a signal indicating that an illuminance sensor corresponding to the second monitor detects the blinking pattern emitted from the screen of the first monitor is received, and the management device transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

Further, according to an embodiment, a management method for managing information regarding a plurality of monitors, the management method including a step of transmitting a signal for causing a screen of a first monitor to blink with a predetermined blinking pattern and a step of setting the first monitor and a second monitor in the same group in a case where a signal indicating that an illuminance sensor corresponding to the second monitor detects the blinking pattern emitted from the screen of the first monitor is received; and a step of transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

Further, according to an embodiment, a non-transitory computer readable medium storing a management program for causing a computer to manage information regarding a plurality of monitors, the management program causing the computer to execute a procedure of transmitting a signal for causing a screen of a first monitor to blink with a predetermined blinking pattern, and a procedure of setting the first monitor and a second monitor in the same group in a case where a signal indicating that an illuminance sensor corresponding to the second monitor detects the blinking pattern emitted from the screen of the first monitor is received, and a procedure of transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

DETAILED DESCRIPTION

A management device and a management method according to the present embodiment will be described below with reference to the drawings.

A configuration of a management system including the management device according to the present embodiment will be described first.

Figure 1:
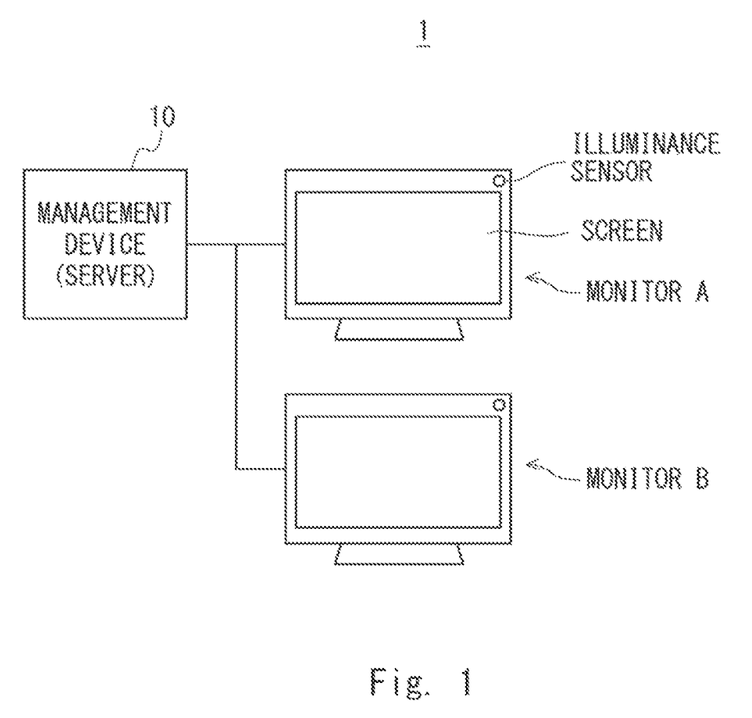
FIG. 1 is a view illustrating a schematic configuration of a management system 1 according to an embodiment.

FIG. 1 is a view illustrating a schematic configuration of a management system 1 according to the present embodiment.

The management system 1, which is, for example, a system provided in a reading room within a hospital, includes a management device 10, a monitor A, a monitor B, and the like. The number of monitors is not limited to two. Further, the management device 10 is connected to the monitors A and B via a reading terminal (not illustrated), or the like, or via a wired or wireless network.

The management device 10, which is, for example, a server, manages operation states, accuracy management information, or the like, of respective monitors in an integrated manner using management software or remotely executes accuracy management task (such as calibration) on the respective monitors through operation of the management software. Typically, the task is often remotely executed in unit of a monitor installation location for convenience of monitor accuracy management operation at the hospital.

Further, the management device 10, for example, transmits a signal for causing a screen of the monitor A to blink with a predetermined blinking pattern and receives a signal indicating that an illuminance sensor of the monitor B detects the blinking pattern from the monitor B. Then, in a case where the management device 10 receives the signal, the management device 10 sets the monitor A and the monitor B in the same group.

Note that in the present specification, for example, a plurality of monitors located within a predetermined region such as a plurality of monitors located in the same room and a plurality of monitors located within a partitioned compartment, that is, a plurality of monitors located at the same location will be defined as monitors belonging to the "same group". This predetermined region may be indoor or may be outdoor.

The monitor A and the monitor B are, for example, medical monitors and each includes a screen on which an image is to be displayed and an illuminance sensor which detects luminance of ambient light. The medical monitors are often used in combination with client software for managing accuracy, and also here, include a mechanism which allows operation of the monitors A and B from the client software.

Note that at the monitors A and B, blinking of the screens and detection of illuminance may be executed by firmware alone incorporated into the monitors or may be executed in combination of control of the PCs connected to the monitors and the firmware of the monitors.

Further, identifiers (ID) which are managed by the management device are respectively provided to the monitors A and B.

The configuration as described above enables the management device 10 or the management system 1 according to the present embodiment to group a plurality of monitors located at the same location with high accuracy.

Note that respective components implemented by the management device 10 can be, for example, implemented by programs being executed by control of an arithmetic device (not illustrated) provided at the management device 10 which is a computer. More specifically, the management device 10 is implemented by a program stored in a storage unit (not illustrated) being loaded to a main memory (not illustrated) and executed by control of the arithmetic device.

Further, the respective components may be implemented by combination of one of hardware, firmware and software as well as being implemented with software by the program.

The above-described program is stored using various types of non-transitory computer-readable media and can be supplied to the management device 10. The non-transitory computer-readable media include various types of tangible storage media.

Examples of the non-transitory computer-readable media include a magnetic recording medium (for example, a flexible disk, a magnetic tape, a hard disk drive), a magnetooptical recording medium (for example, a magnetooptical disk), a CD-ROM (read only memory), a CD-R, a CD-R/W, a semiconductor memory (for example, a mask ROM, a PROM (programmable ROM), an EPROM (erasable PROM), a flash ROM, a RAM (random access memory)).

Further, the program may be supplied to the management device 10 using various types of transitory computer-readable media. Examples of the transitory computer-readable media include an electric signal, an optical signal and an electromagnetic wave. The transitory computer-readable medium can supply a program to the management device 10 via a wired communication path such as an electric wire and an optical fiber or via a wireless communication path.

Operation of the management device 10 or the management system 1, that is, a management method according to the present embodiment will be described next.

Figure 2:
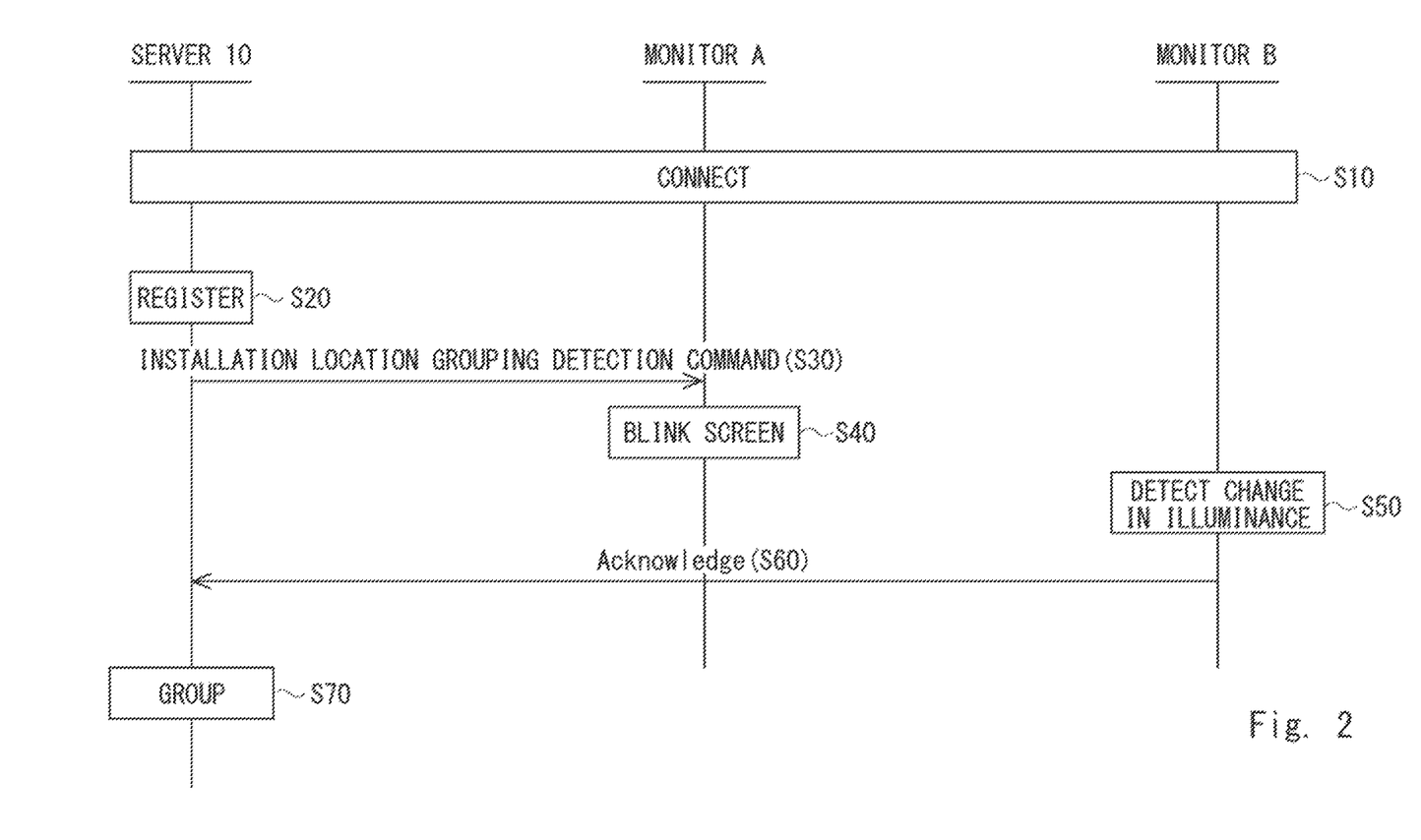
FIG. 2 is a sequence diagram illustrating a processing procedure of a management method according to the embodiment.

FIG. 2 is a sequence diagram illustrating a processing procedure of the management method according to the present embodiment.

Here, a case will be described where a plurality of medical monitors are introduced to a reading room of a hospital and automatically and efficiently grouped.

First, a plurality of monitors including the monitor A and the monitor B are introduced to the reading room of the hospital and respectively connected to personal computers (PCs) such as reading terminals (step S10).

Then, individual monitor information is registered in management software of the server 10 through client software installed at the PCs, so that the monitors can be managed in an integrated manner (step S20). At this time point, the monitors in the reading room are only individually registered in the management software, and not grouped for each of installation locations of the monitors.

Thereafter, the installation locations of the monitors are automatically grouped. If necessary, the light of the reading room to which the monitors are introduced may be turned off.

An "installation location grouping detection command" is issued to a specific one monitor, here, the monitor A on the management software of the server 10 (step S30).

The monitor A which has received the "installation location grouping detection command" causes a monitor screen to blink with a given blinking pattern (for example, lighted for four seconds, put off for two seconds, lighted for three seconds, put off for four seconds, . . . ) by firmware control (step S40). The given blinking pattern is preferably a blinking pattern which does not usually exist, such as a blinking pattern which has regularity or which is modulated.

In this event, firmware of other monitors including the monitor B continuously measures change of luminance of ambient light using built-in illuminance sensors. Then, for example, when the monitor B detects change in illuminance in accordance with the above-described given blinking pattern (step S50), the monitor B returns "acknowledge" to the management software of the server 10 along with an ID of the monitor B (step S60).

The management software of the server 10 which has received "acknowledge" judges that the monitor A which has transmitted the "installation location grouping detection command" and the monitor B which has returned "acknowledge" are located at the same location, that is, belong to the same group and, for example, groups the monitor A and the monitor B in the same group using the IDs (step S70).

Then, by repeating the processing from step S40 to step S70 described above, the "installation location grouping detection command" is respectively issued to all the monitors, and the monitors are grouped.

According to such a procedure, the management method according to the present embodiment can automatically and efficiently group monitors located at the same location with high accuracy.

Some specific examples of the management method according to the present embodiment will be described next.

FIRST SPECIFIC EXAMPLE

Figure 3A:
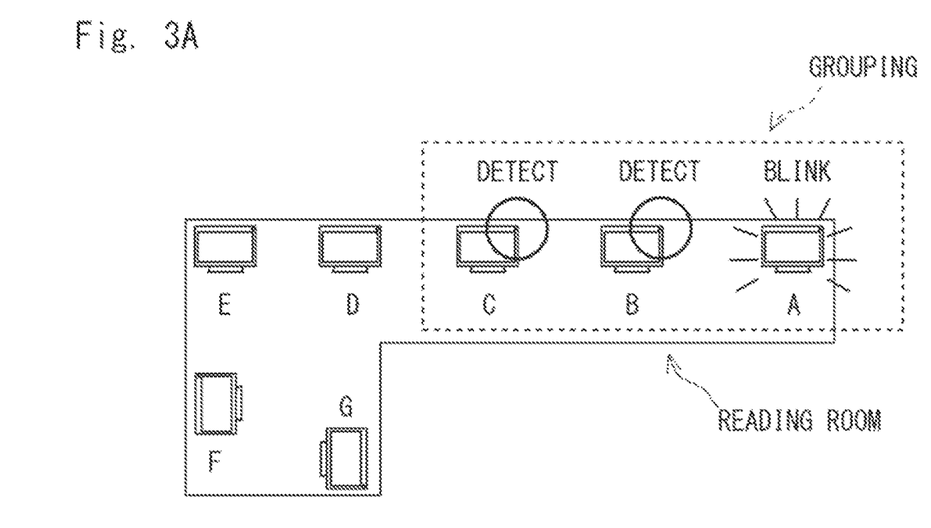
FIG. 3A is a view for explaining a first specific example of the management method according to the embodiment.
Figure 3B:
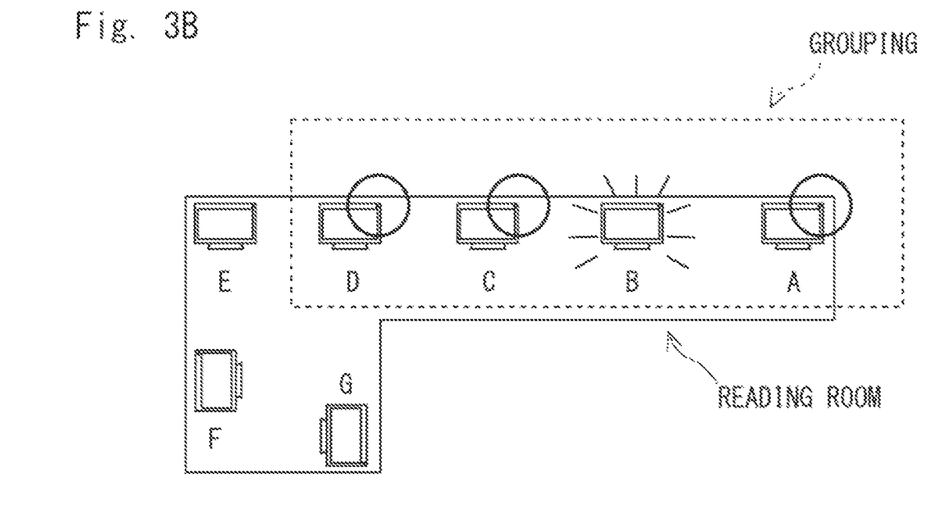
FIG. 3B is a view for explaining the first specific example of the management method according to the embodiment.
Figure 3C:
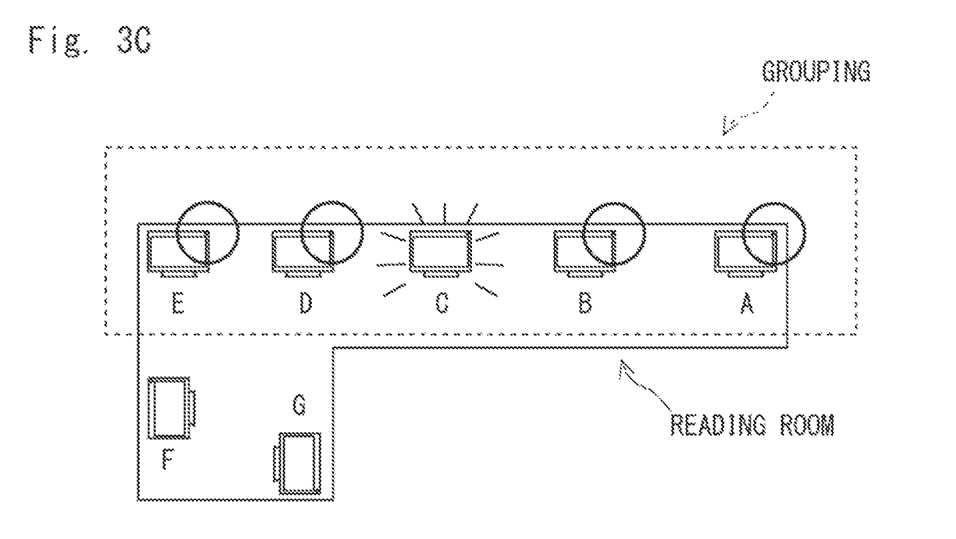
FIG. 3C is a view for explaining the first specific example of the management method according to the embodiment.

FIG. 3A to FIG. 3C are views for explaining a first specific example of the management method according to the present embodiment. The first specific example is an example where all monitors to be grouped are caused to sequentially blink to group the monitors in a similar manner as described above.

Seven monitors A, B, C, D, E, F and G are provided within an L-shaped reading room, and these monitors have already been connected to a server (not illustrated) via reading terminals (not illustrated), or the like.

First, as illustrated in FIG. 3A, the server causes a screen of the monitor A to blink, and in a case where illuminance sensors of the monitors B and C detect change in illuminance by the blinking, the server groups the monitors A, B and C.

Then, as illustrated in FIG. 3B, the server causes a screen of the monitor B to blink, and in a case where illuminance sensors of the monitors A, C and D detect change in illuminance, the server groups the monitors A, B, C and D.

Then, as illustrated in FIG. 3C, the server causes a screen of the monitor C to blink, and in a case where illuminance sensors of the monitors A, B, D and E detect change in illuminance, the server groups the monitors A, B, C, D and E.

In a similar manner, the server causes a screen of the monitor D to blink, and in a case where illuminance sensors of the monitors B, C, E and F detect change in illuminance, the server groups the monitors B, C, D, E and F and the monitor A which has already been grouped with the monitors B, C, D and E.

Further, the server causes a screen of the monitor E to blink, and in a case where illuminance sensors of the monitors C, D and G detect change in illuminance, the server groups the monitors C, D, E and G and the monitors A, B and F which have already been grouped with the monitors C, D and E.

Further, the server causes a screen of the monitor F to blink, and in a case where illuminance sensors of the monitors D and G detect change in illuminance, the server groups the monitors D, F and G and the monitors A, B, C and E which has already been grouped with the monitors D, F and G.

Further, the server causes a screen of the monitor G to blink, and in a case where illuminance sensors of the monitors E and F detect change in illuminance, the server groups the monitors E, F and G and the monitors A, B, C and D which have already been grouped with the monitors E, F and G.

In this manner, in the first specific example of the management method, by sequentially blinking all the monitors to be grouped, it is possible to group monitors located at the same location with high accuracy.

SECOND SPECIFIC EXAMPLE

Figure 4A:
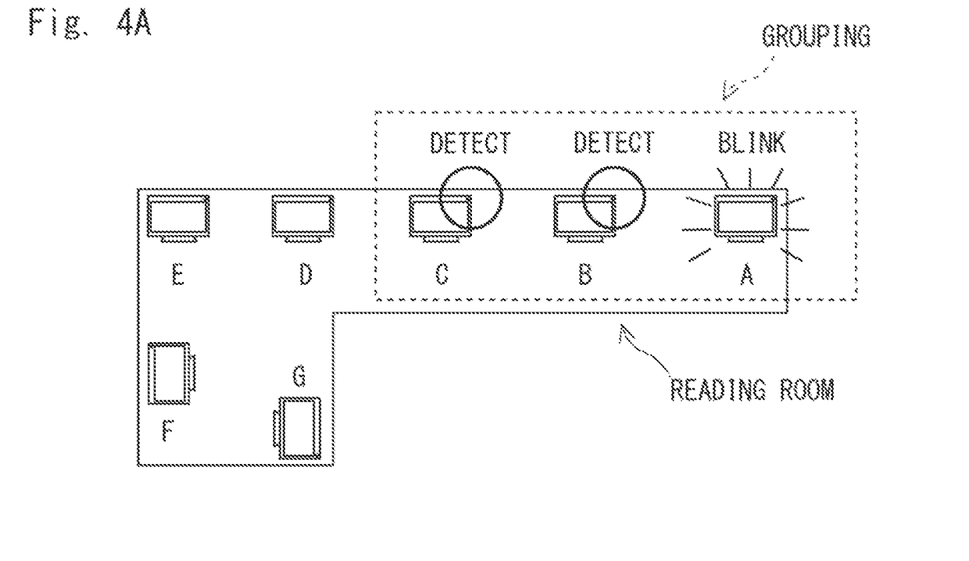
FIG. 4A is a view for explaining a second specific example of the management method according to the embodiment.
Figure 4B:
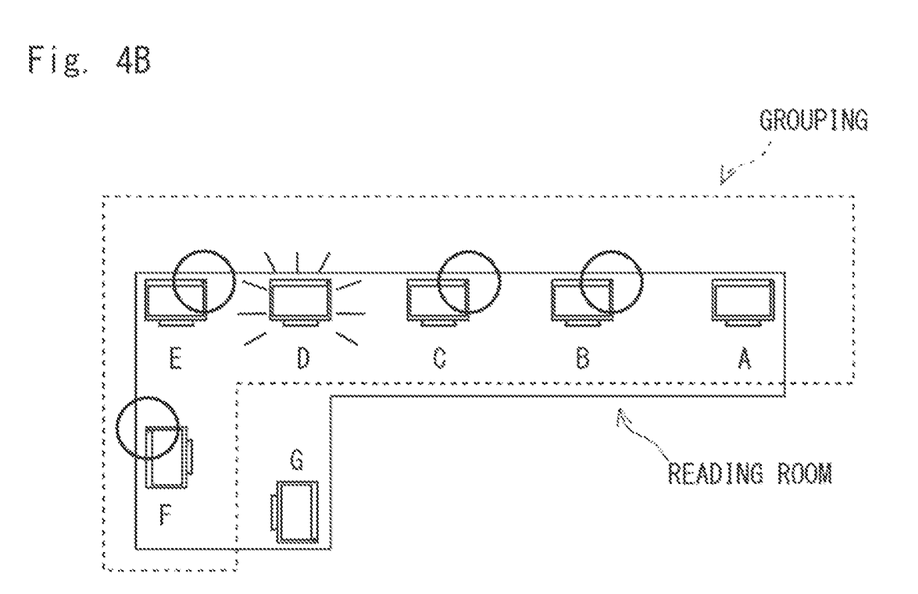
FIG. 4B is a view for explaining the second specific example of the management method according to the embodiment.
Figure 4C:
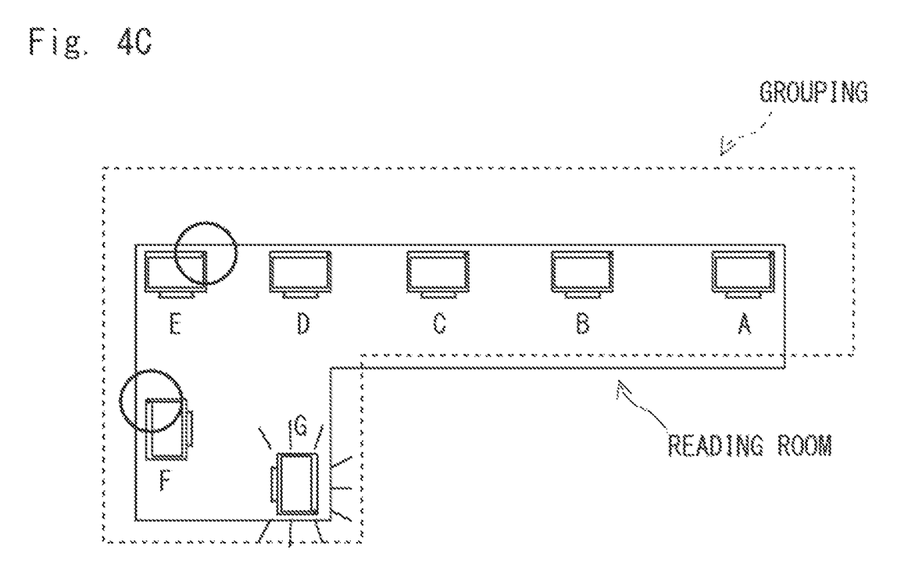
FIG. 4C is a view for explaining the second specific example of the management method according to the embodiment.

FIG. 4A to FIG. 4C are views for explaining a second specific example of the management method according to the present embodiment. The second specific example is an example where one monitor is caused to blink to group monitors, and then, a monitor which is not grouped is caused to blink to group monitors again.

Also in this example, seven monitors are provided within an L-shaped reading room, and these monitors have also already been connected to a server via reading terminals, or the like.

First, as illustrated in FIG. 4A, the server causes the screen of the monitor A to blink, and in a case where the illuminance sensors of the monitors B and C detect change in illuminance by the blinking, the server groups the monitors A, B and C.

Then, as illustrated in FIG. 4B, the server causes the screen of the monitor D which has not been grouped in a state illustrated in FIG. 4A to blink, and in a case where the illuminance sensors of the monitors B, C, E and F detect change in illuminance, the server groups the monitors B, C, D, E and F and the monitor A which has already been grouped with the monitors B and C. In this event, the monitors B, C, E and F which detect change in illuminance include the monitors B and C which have already been grouped, and thus, the server groups the monitor D which is lighted and the monitors E and F which detect change in illuminance in the group which has already been set.

Then, as illustrated in FIG. 4C, the server causes the screen of the monitor G which has not been grouped in a state illustrated in FIG. 4B to blink, in a case where the illuminance sensors of the monitors E and F detect change in illuminance, the server groups the monitors E, F and G and the monitors A, B, C and D which have already been grouped with the monitors E and F.

In this manner, in the second specific example of the management method, by only causing the monitors to be grouped to blink three times, it is possible to efficiently group monitors located at the same location with high accuracy.

THIRD SPECIFIC EXAMPLE

Figure 5A:
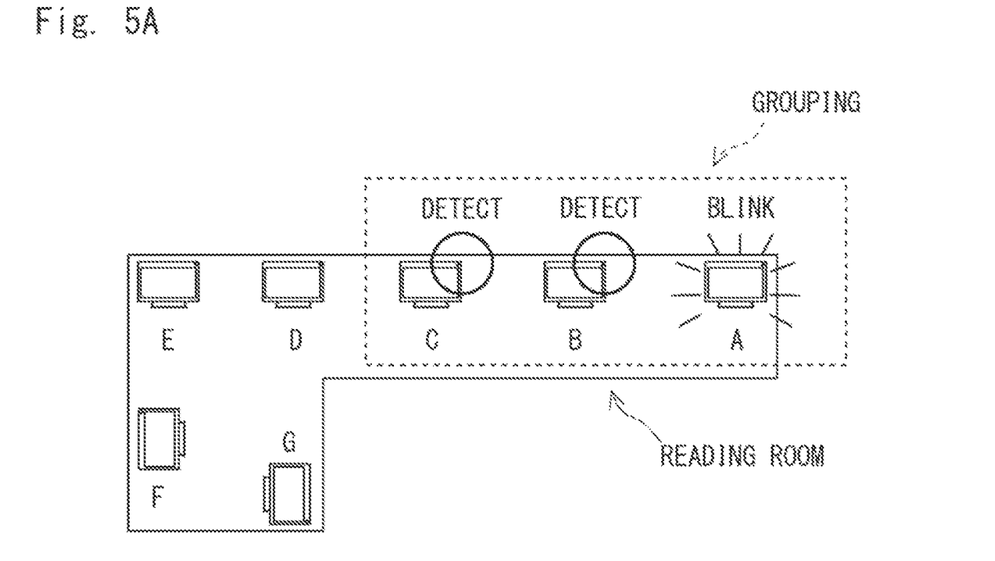
FIG. 5A is a view for explaining a third specific example of the management method according to the embodiment.
Figure 5B:
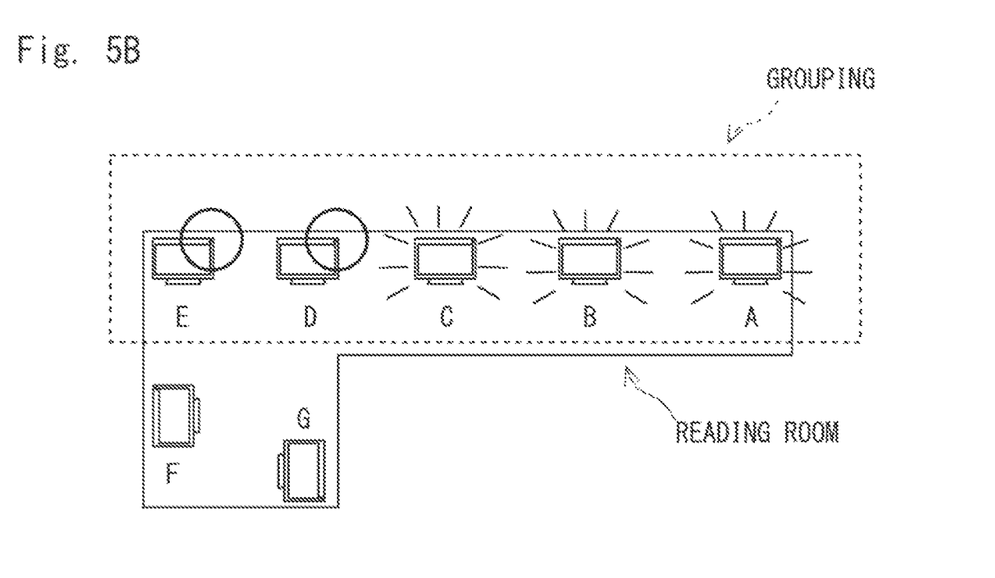
FIG. 5B is a view for explaining the third specific example of the management method according to the embodiment.
Figure 5C:
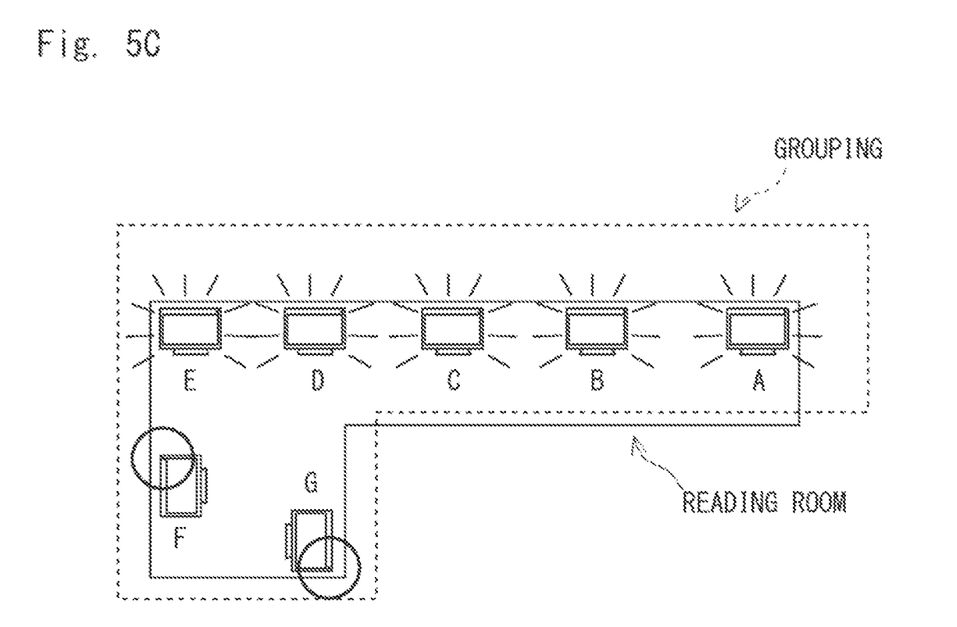
FIG. 5C is a view for explaining the third specific example of the management method according to the embodiment.

FIG. 5A to FIG. 5C are views for explaining a third specific example of the management method according to the present embodiment. The third specific example is an example where one monitor is caused to blink to group monitors, and the grouped monitors are caused to blink at the same time to group monitors again.

Also in this example, seven monitors are provided within an L-shaped reading room, and these monitors have also already been connected to a server via reading terminals, or the like.

First, as illustrated in FIG. 5A, the server causes the screen of the monitor A to blink, and in a case where the illuminance sensors of the monitors B and C detect change in illuminance by the blinking, the server groups the monitors A, B and C.

Then, as illustrated in FIG. 5B, the screens of the monitors A, B and C grouped in a state illustrated in FIG. 5A are caused to blink at the same time, and in a case where the illuminance sensors of the monitors D and E detect change in illuminance, the server groups the monitors A, B, C, D and E.

Then, as illustrated in FIG. 5C, the screens of the monitors A, B, C, D and E grouped in a state illustrated in FIG. 5B are caused to blink at the same time, and in a case where the illuminance sensors of the monitors F and G detect change in illuminance, the server groups the monitors A, B, C, D, E, F and G.

In this manner, in the third specific example of the management method, also by only causing monitors to be grouped to blink three times, it is possible to efficiently group monitors located at the same location with high accuracy.

Note that various additions, modifications or changes can be made in the management device 10, the management system 1 or the management method according to the present embodiment.

For example, when ambient light is changed by blinking of a screen, and this change is detected by the illuminance sensor, higher luminance of the blinking screen is advantageous for causing a monitor located farther to detect change in illuminance. Typically, the medical monitor has a function of changing a backlight level (illuminance level) of a screen by control by firmware of the monitor or by control of corresponding client software.

Thus, the management system 1 or the management method according to the present embodiment can also perform the following control.

(1) Each monitor stores a current backlight level of a screen before a screen of the monitor is blinked, that is, during normal use of the monitor.
(2) In a case where the monitor receives the "installation location grouping detection command" and starts blinking of the screen, the monitor controls the backlight of the screen and increases the backlight level to a maximum of display specifications.
(3) The monitor blinks the screen, and the server performs grouping.
(4) After grouping, the monitor returns the backlight level of the screen to the stored level.

Through such control, it is possible to improve detection sensitivity of installation location grouping detection operation.

Further, in the management system 1 or the management method according to the present embodiment, while a server is used as the management device 10, cloud service may be used in place of the management device 10.

Further, in the management system 1 or the management method according to the present embodiment, while medical monitors are set as grouping targets, illuminance sensors may be temporarily externally attached to normal monitors, and the normal monitors may be set as grouping targets.

The present invention can be utilized in a case where equipment is managed via a wired or wireless network.

What is claimed is:

1. A management device to which a plurality of monitors are connected and which manages information regarding the plurality of monitors,
   the management device transmitting a signal for causing a screen of a first monitor to blink with a predetermined blinking pattern and setting the first monitor and a second monitor in the same group in a case where a signal indicating that an illuminance sensor corresponding to the second monitor detects the blinking pattern emitted from the screen of the first monitor is received, and
   the management device transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

2. The management device according to claim 1, wherein in a case where another monitor is in the same group as the group of the first monitor or the second monitor in advance, the management device also sets the other monitor in the same group.

3. The management device according to claim 1, wherein the management device transmits a signal for causing screens of monitors which are judged as belonging to the same group to blink with the predetermined blinking pattern at the same time.

4. A management system comprising the management device according to claim 1, and the plurality of monitors.

5. The management system according to claim 4, wherein the monitor increases a backlight level in a case where a signal for causing a screen of the monitor to blink with the predetermined blinking pattern is received.

6. A management method for managing information regarding a plurality of monitors, the management method comprising:
   a step of transmitting a signal for causing a screen of a first monitor to blink with a predetermined blinking pattern;
   a step of setting the first monitor and a second monitor in the same group in a case where a signal indicating that an illuminance sensor corresponding to the second monitor detects the blinking pattern emitted from the screen of the first monitor is received; and
   a step of transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

7. A non-transitory computer readable medium storing a management program for causing a computer to manage information regarding a plurality of monitors, the management program causing the computer to execute:
- a procedure of transmitting a signal for causing a screen of a first monitor to blink with a predetermined blinking pattern;
- a procedure of setting the first monitor and a second monitor in the same group in a case where a signal indicating that an illuminance sensor corresponding to the second monitor detects the blinking pattern emitted from the screen of the first monitor is received; and
- a procedure of transmitting a signal for causing a screen of a third monitor to blink with the predetermined blinking pattern in a case where a signal indicating that an illuminance sensor corresponding to the third monitor detects the blinking pattern emitted from the screen of the first monitor is not received.

* * * * *